Aug. 29, 1944.  R. D. PIKE  2,357,130
PRODUCTION OF MAGNESIUM CHLORIDE FROM CALCIUM CHLORIDE AND DOLOMITE
Filed May 5, 1942
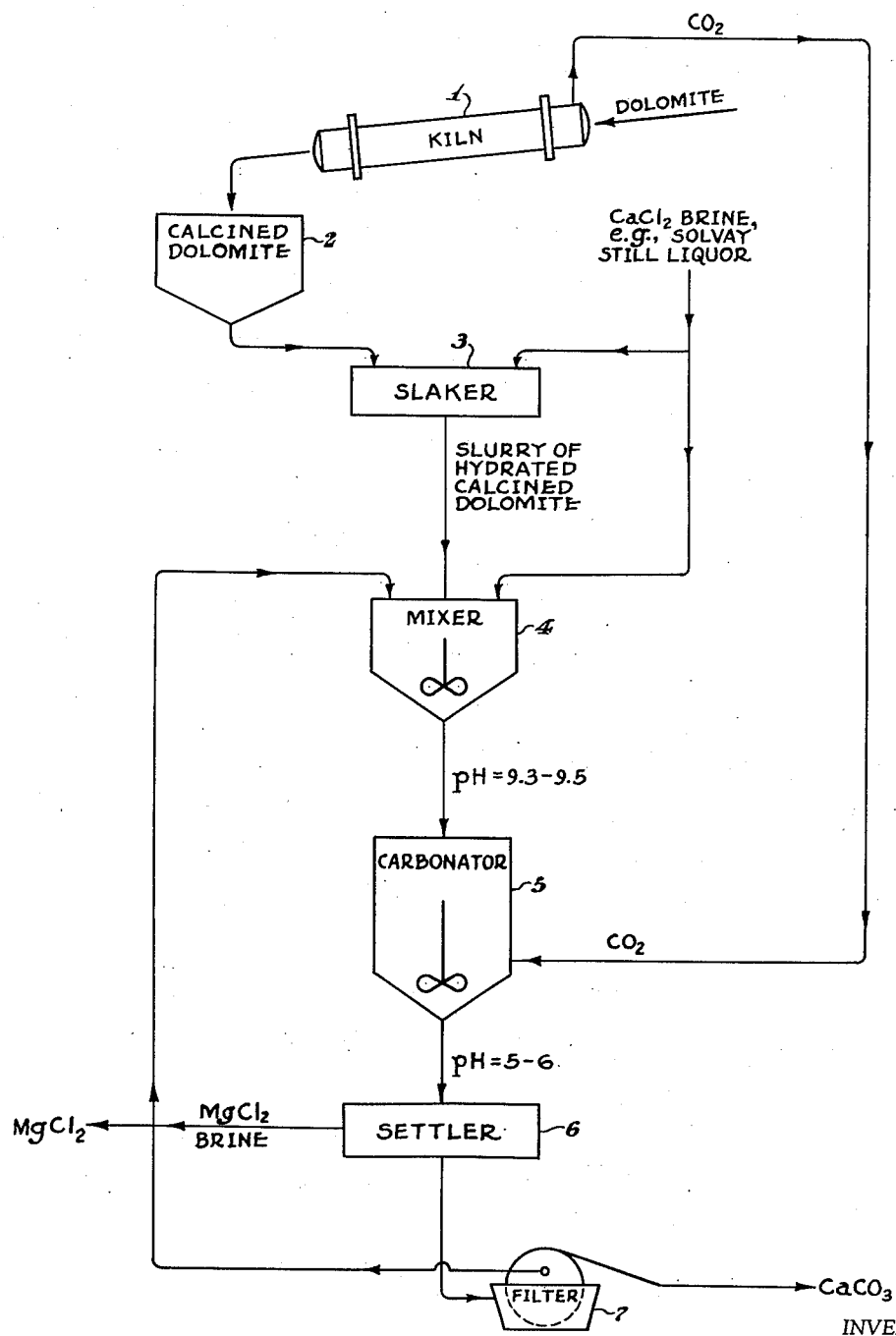
INVENTOR.
ROBERT D. PIKE.
BY Brown, Critchlow & Flick
his ATTORNEYS.

Patented Aug. 29, 1944

2,357,130

UNITED STATES PATENT OFFICE 2,357,130

PRODUCTION OF MAGNESIUM CHLORIDE FROM CALCIUM CHLORIDE AND DOLOMITE

Robert D. Pike, Pittsburgh, Pa., assignor to Harbison-Walker Refractories Company, Pittsburgh, Pa., a corporation of Pennsylvania Application May 5, 1942, Serial No. 441,806

10 Claims. (Cl. 23—66)

This invention relates to the manufacture of magnesium chloride from calcium chloride, and this application is a continuation-in-part of my copending application Serial No. 402,935, filed July 18, 1941.

It is possible to produce magnesium chloride and calcium carbonate by the following reaction:

$$Mg(OH)_2 + CaCl_2 + CO_2 = MgCl_2 + CaCO_3 + H_2O$$

Any lime present, for example as calcium hydroxide, or hydrated lime, [$Ca(OH)_2$] will likewise be converted to the carbonate.

Dolomite, which is widely distributed throughout the United States, would provide, after being calcined, a suitable source of convertible magnesia for use in applying that reaction, and calcium chloride in large quantities is available, for example as a brine (still liquor) by-product of the Solvay process, in regions where dolomite occurs. Ideally the use of those materials to carry out the foregoing reaction would provide a means of producing raw material for making magnesium, not only because of the simplicity of the reaction and the availability and cheapness of the materials needed, but also because plants for practicing the process could be located close in regions far enough from the borders of this country to be reasonably safe from enemy attack. However, when that reaction is carried out by reacting calcined dolomite, calcium chloride ($CaCl_2$) and carbon dioxide ($CO_2$), it is found that the calcium carbonate ($CaCO_3$) produced settles extremely slowly and is difficult to filter and wash. Thus to practice the process in accordance with prior proposals large settling tank and filter areas are required per unit of carbonate produced, and this is obviously disadvantageous and uneconomical with large scale operations.

It is among the objects of this invention to provide an improved process of making magnesium chloride from dolomite and calcium chloride which is characterized by producing a quick settling calcium carbonate that forms a dense slurry which filters and washes freely and quickly and is of high purity, and further by being easily performed and controlled and by requiring much smaller settling and filtering areas than are needed for practice in accordance with prior proposals.

A further object is to provide a process of this type which embodies the foregoing advantages and features and in which calcium chloride is supplied in the form of a brine, and a part only of the magnesium chloride produced is circulated in the system in furtherance of operating economies.

Yet another object is to provide a process in accordance with the foregoing objects in which the calcium chloride used is derived from still liquors of the Solvay ammonia-soda process.

Other objects will appear from the following description.

The invention will be described in detail with reference to the accompanying drawing which is a flow sheet representative of the preferred embodiment of the invention.

The process provided by the present invention differs from prior proposals in that carbonation is not undertaken until after the lime present in the dolomite has been converted to calcium chloride, so that when carbonation is initiated the reaction body comprises a suspension of magnesium hydroxide in a brine of calcium chloride. Stated otherwise, the present invention is predicated upon my discovery that its stated objects are attained by first reacting slaked calcined dolomite with magnesium chloride to convert the lime, present largely as calcium hydroxide, substantially wholly to calcium chloride, and effecting carbonation only after that reaction has been completed. Upon carbonation the calcium chloride is converted to calcium carbonate in a form which settles rapidly to form a dense slurry that filters readily and quickly to form a cake of high solids content and which is easily and quickly washed. At the same time the magnesium hydroxide present in the reaction mixture is converted to magnesium chloride which is recovered as a brine in the settling and filtration of the calcium carbonate.

In practicing the invention dolomite is calcined, the carbon dioxide produced being recovered for carrying out the carbonation step. The calcined dolomite is then slaked, suitably with calcium chloride, e. g. still liquor, in an amount sufficient to provide a free flowing slurry. The slaked material is then mixed with sufficient magnesium chloride, suitably as a brine, to react with all of the calcium hydroxide present in the dolomite and to supply about 5 to 10 per cent in excess of that requirement. This results in a slurry of convertible magnesia ($Mg(OH)_2$ with, perhaps, some MgO) in a calcium chloride brine which contains but little magnesium chloride in solution. An important feature of the invention resides in carrying this reaction to completion before introduction of carbon dioxide; the reaction occurs quite quickly. Completion of the reaction is evidenced by the fact that the slurry will possess a pH between about 9.3 to 9.5, and in any case not less than about 9.1 or more than about 9.7, these limits being critical in producing a calcium carbonate having the characteristics described. The temperature is not critical but for most purposes I prefer that the slurry be at about 20 to 25° C. before starting carbonation. As described in my aforesaid copending application, the slurry should contain from 20 to 30 per cent excess calcium chloride over the requirements of the carbonation reaction. The slurry may then be carbonated by introducing carbon dioxide gas, most suitably with violent agitation, and the completion of this reaction is evidenced by attainment of a pH of between 5 and 6, when substantially all of the convertible magnesia will have been converted to magnesium chloride and the calcium chloride to calcium carbonate.

In my aforesaid copending application I have described and claimed a cyclic two-stage process of producing magnesia in the first stage of which calcined dolomite is hydrated and then reacted with a magnesium chloride brine to produce hydrated magnesia and a calcium chloride brine. In the second stage the calcium chloride brine from the first stage is reacted with a further amount of hydrated calcined dolomite to regenerate magnesium chloride liquor for use in the first stage of the process. The process described herein is disclosed and claimed in the aforesaid application in connection with the second stage of that cyclic process. However, the present process may be used in a non-cyclic manner for the production and recovery of magnesium chloride, but preferably a part of the magnesium chloride brine produced is recirculated in the system for the conversion of the lime of the dolomite to calcium chloride in the manner described.

The preferred embodiment of the invention is illustrated in the accompanying flow sheet to which reference may be made in further describing the invention. As shown, raw dolomite is calcined in a kiln 1 from which it is passed to a storage bin 2. The calcined dolomite from bin 2 is mixed in a slaker 3 with Solvay process still liquor (CaCl$_2$ brine) to hydrate the calcined dolomite, and most suitably the brine is supplied in an amount such and the mixture is agitated strongly enough to produce a lump-free flowable slurry.

The slurry from slaker 3 is passed to a mixer 4 where it is mixed with magnesium chloride, suitably in the form of a brine which is recirculated in the system, and a further amount of calcium chloride brine, e. g. as Solvay still liquor may be added at this point. The reaction between magnesium chloride, present in the excess stated above, and hydrated lime occurs in mixer 4, and ordinarily it will be completed in between about 20 to 40 minutes. Complete conversion of the calcium hydroxide present into magnesium hydroxide and calcium chloride, as is necessary in this process, is signified by the attainment of a pH between about 9.1 and 9.7, but most suitably between 9.3 and 9.5.

Calcium chloride brine from the Solvay process may typically contain about 90 pounds of calcium chloride and 39 pounds of sodium chloride per 100 gallons of brine. If desired for any reason, the still liquor may be treated prior to addition to slaker 3 and mixer 4 to reduce or eliminate its content of sodium chloride. If not removed from the brine, the sodium chloride may be removed later, if need be, from the final MgCl$_2$ brine.

The slurry of magnesium hydroxide suspended in calcium chloride brine, substantially free from calcium hydroxide but containing sodium chloride where it is present in the calcium chloride feed, is gelatinous in appearance. It is passed to a carbonator 5 where it is agitated violently and contacted with carbon dioxide gas, suitably the stack gases from kiln 1 containing, on a dry basis, about 25 per cent CO$_2$ by volume. The gas, which may be washed and cooled before use, is introduced at about 5 pounds per square inch pressure. Treatment in carbonator 5 is continued until the pH is between 5 to 6, which generally requires about 80 to 100 minutes. When the acidity reaches the value stated the reaction is about 94 to 97.5 per cent complete and is ended for all practical purposes.

After the reaction in carbonator 5 has been completed the slurry of calcium carbonate in magnesium chloride brine is passed to a settler 6 where it is thickened. The underflow is passed to a filter 7. The filtrate from the filter is added to the overflow from settler 6, and the mixed brine may be treated to recover magnesium chloride or, as indicated in the flow sheet, the necessary portion, generally somewhat more than half, is returned to mixer 4, the remainder being treated to recover magnesium chloride.

I have found, as indicated above, that the critical factor in producing a rapidly settling and free filtering calcium carbonate by this reaction is the pH of the slurry before beginning carbonation, which evidences the completion of the reaction between magnesium chloride and hydrated lime. The importance of controlling this factor is evidenced by the following tabulation of results actually obtained in the course of my tests:

| Test No. | Starting pH of Mg(OH)$_2$–CaCl$_2$ slurry | MgO in CaCO$_3$ | Solids in thickened slurry after carbonation | Water in carbonation filter cake | Time to form carbonate cake | Pounds solids in formed cake/sq. ft. of forming area/hr. | Time for washing cake | Gals. of wash/sq. ft. of washed area/hr. |
|---|---|---|---|---|---|---|---|---|
|  |  | Per cent | Per cent | Per cent | Seconds |  | Seconds |  |
| 1 | 10.65 | 1.45 | 13.0 |  | 705 | 6.0 | 1,110 | 0.24 |
| 2 | 9.91 | 1.1 | 26.0 | 43.3 | 135 | 42.0 | 133 | 10.00 |
| 3 | 9.42 | 1.3 | 50.0 | 43.3 | 24 | 180.0 | 54 | 24.00 |
| 4 | 9.37 | 1.2 | 53.0 | 40.0 | 21 | 250.0 | 50 | 23.80 |

It will be observed that a relatively small change of starting pH prior to carbonation has an extremely great effect upon the physical nature, or settling and filtering characteristics, of the carbonate produced. This is evidenced, for example, by the density of the settled slurry and the filtering rate. In the tests covered by the foregoing tabulation the cakes were about 1/16 inch thick, but cakes twice as thick may be handled easily if desired.

In addition to the great advantage of the present process in providing a carbonate which settles quickly and filters freely and rapidly, whereby extensive settling and filtering areas are not required, the process has the advantage that the carbonate produced is of high purity. Generally it contains from about one to not over about 2 per cent of the MgO on the dry basis, which adapts it to various commercial uses.

According to the provisions of the patent statutes I have explained the principle and method of practicing my invention and have illustrated and described what I now consider to represent its best embodiment. However, I desire to have it understood that, within the scope of the appended claims, the invention may be practiced otherwise than as specifically illustrated and described.

I claim:

1. That method of making magnesium chloride and calcium carbonate which comprises mixing calcined dolomite, calcium chloride brine, and magnesium chloride brine to produce a slurry of hydrated magnesia and calcium chloride containing an excess magnesium chloride and containing substantially no lime, and then passing carbon dioxide gas into said slurry and thereby producing magnesium chloride solution and calcium carbonate precipitated in a form which settles rapidly and filters and washes freely, and separating said calcium carbonate from the magnesium chloride mother solution.

2. That method of making magnesium chloride and calcium carbonate which comprises mixing calcined dolomite, calcium chloride brine, and magnesium chloride brine to produce a slurry of hydrated magnesia and calcium chloride and containing substantially no lime and having a pH of about 9.1 to 9.7 and then passing carbon dioxide gas into said slurry and thereby producing magnesium chloride solution and calcium carbonate precipitated in a form which settles rapidly and filters and washes freely, and separating said calcium carbonate from the magnesium chloride mother solution.

3. That method of making magnesium chloride and calcium carbonate which comprises slaking calcined dolomite and mixing therewith magnesium chloride brine to produce a slurry of hydrated magnesia and calcium chloride and containing substantially no lime and having a pH of about 9.1 to 9.7 and containing about 5 to 10 per cent excess magnesium chloride, and then passing carbon dioxide gas into said slurry and thereby producing magnesium chloride solution and calcium carbonate precipitated in a form which settles rapidly and filters and washes freely, separating said calcium carbonate from the magnesium chloride solution, and returning at least part of the magnesium chloride solution to the system.

4. A method according to claim 3 in which said dolomite slaking is effected with calcium chloride brine.

5. That method of making magnesium chloride and calcium carbonate which comprises mixing calcined dolomite, calcium chloride brine, and magnesium chloride brine to produce a slurry of hydrated magnesia and calcium chloride and containing substantially no lime and having a pH of about 9.1 to 9.7 and containing about 5 to 10 per cent excess magnesium chloride, and then passing carbon dioxide gas into said slurry and thereby producing magnesium chloride solution and calcium carbonate precipitated in a form which settles rapidly and filters and washes freely, separating said calcium carbonate from the magnesium chloride solution, returning part of said solution to the system, and recovering magnesium chloride from the remainder of said solution.

6. A process according to claim 2, said slurry as prepared for carbonation containing an excess of calcium chloride over the requirements of the carbonation reaction.

7. A process according to claim 3, said slurry containing an excess of calcium chloride over the requirements of the carbonation reaction.

8. A process according to claim 3, said slurry containing 20 to 30 per cent excess calcium chloride over the requirements of the carbonation reaction.

9. In a process of producing magnesium chloride and calcium carbonate by carbonation of a slurry of hydrated magnesia and calcium chloride produced from calcined dolomite and magnesium chloride brine, that combination of steps which comprises preparing a slurry from calcined dolomite, calcium chloride and magnesium chloride in amounts such that the slurry contains an excess of calcium chloride over the stoichiometric requirement of the carbonation reaction and an excess of magnesium chloride over the amount stoichiometrically required to react with all of the lime of said dolomite, whereby the latter reaction is caused to go to completion and bring the slurry to a pH of about 9.1 to 9.7, and then passing into the slurry carbon dioxide to bring the carbonation reaction to at least about 95 per cent completion.

10. A process according to claim 9 in which a portion of the magnesium chloride brine from the carbonation step is recycled to treat a further portion of calcined dolomite.

ROBERT D. PIKE.